(12) United States Patent
Lin

(10) Patent No.: US 6,999,328 B2
(45) Date of Patent: *Feb. 14, 2006

(54) CONTROLLER CIRCUIT SUPPLYING ENERGY TO A DISPLAY DEVICE

(75) Inventor: Yung-Lin Lin, Palo Alto, CA (US)

(73) Assignee: O2Micro International Limited, Grand Cayman (KY)

( * ) Notice: Subject to any disclaimer, the term of this patent is extended or adjusted under 35 U.S.C. 154(b) by 170 days.

This patent is subject to a terminal disclaimer.

(21) Appl. No.: 10/919,955

(22) Filed: Aug. 17, 2004

(65) Prior Publication Data

US 2005/0018456 A1 Jan. 27, 2005

Related U.S. Application Data

(63) Continuation of application No. 10/348,748, filed on Jan. 22, 2003, now Pat. No. 6,778,415.

(51) Int. Cl.
*H02M 7/539* (2006.01)

(52) U.S. Cl. .............................. 363/71; 363/97; 363/98; 363/131; 363/132; 363/134

(58) Field of Classification Search .................. 363/17, 363/21.12, 21.13, 25, 71, 72, 97, 98, 131, 363/132, 134
See application file for complete search history.

(56) References Cited

U.S. PATENT DOCUMENTS

| | | | | |
|---|---|---|---|---|
| 5,875,103 A | * | 2/1999 | Bhagwat et al. | 363/17 |
| 6,574,125 B1 | * | 6/2003 | Matsukawa et al. | 363/71 |
| 6,600,296 B1 | * | 7/2003 | Hazucha | 323/237 |
| 6,778,415 B1 | * | 8/2004 | Lin | 363/71 |

* cited by examiner

Primary Examiner—Jeffrey Sterrett
(74) Attorney, Agent, or Firm—Grossman, Tucker, Perreault & Pfleger, PLLC (57) ABSTRACT

A controller for controlling at least two power circuits comprises a pulse generator and a selector. The pulse generator generates a first pulse signal which is coupled to a first power circuit of the at least two power circuits for initiating the operation of the first power circuit. The first power circuit then outputs a second pulse signal to a second power circuit of the at least two power circuits to initiate the operation of the second power circuit. The selector generates a reference signal which is coupled to each of the at least two power circuits for indicating a number of power circuits controlled. The controller is used to control energy supplying to an electrical circuit comprising multiple inverters and is more particularly to provide phase shifts to the electrical circuit. Usually, the electrical circuit is applied to display devices, such as liquid crystal display monitors, liquid crystal display computers and liquid crystal display televisions.

11 Claims, 12 Drawing Sheets

FIG. 5 m=3 EXAMPLE

| sel 0 | sel 1 | sel 2 | sel 3 | Vaa |
|---|---|---|---|---|
| 0 | 0 | 0 | 0 | 1/16 |
| 0 | 0 | 0 | 1 | 2/16 |
| 0 | 0 | 1 | 0 | 3/16 |
| 0 | 0 | 1 | 1 | 4/16 |
| 0 | 1 | 0 | 0 | 5/16 |
| 0 | 1 | 0 | 1 | 6/16 |
| 0 | 1 | 1 | 0 | 7/16 |
| 0 | 1 | 1 | 1 | 8/16 |
| 1 | 0 | 0 | 0 | 9/16 |
| 1 | 0 | 0 | 1 | 10/16 |
| 1 | 0 | 1 | 0 | 11/16 |
| 1 | 0 | 1 | 1 | 12/16 |
| 1 | 1 | 0 | 0 | 13/16 |
| 1 | 1 | 0 | 1 | 14/16 |
| 1 | 1 | 1 | 0 | 15/16 |
| 1 | 1 | 1 | 1 | 16/16 |

CONTROLLER CIRCUIT SUPPLYING ENERGY TO A DISPLAY DEVICE

CROSS REFERENCE TO RELATED APPLICATIONS

This application is a continuation of U.S. Nonprovisional application Ser. No. 10/348,748 filed Jan. 22, 2003 now U.S. Pat. No. 6,778,415, the teachings of which are herein incorporated by reference, which claims priority to U.S. application Ser. No. 10/299,206 filed Nov. 19, 2002, now U.S. Pat. No. 6,707,264, and to U.S. application Ser. No. 09/757,265, filed Jan. 9, 2001, now U.S. Pat. No. 6,501,234, both of which are also incorporated herein by reference.

BACKGROUND OF THE INVENTION

1. Field of the Invention

The present invention generally relates to electrical circuits for supplying energy to multiple loads, such as CCFL (Cold-Cathode-Fluorescent-Lamp) loads and more particularly to electrical circuits for providing phase shifts to multiple loads. Usually, the electrical circuits are applied to display devices, such as liquid crystal display monitors, liquid crystal display computers or liquid crystal display televisions.

2. Description of the Related Art

Figure 1:
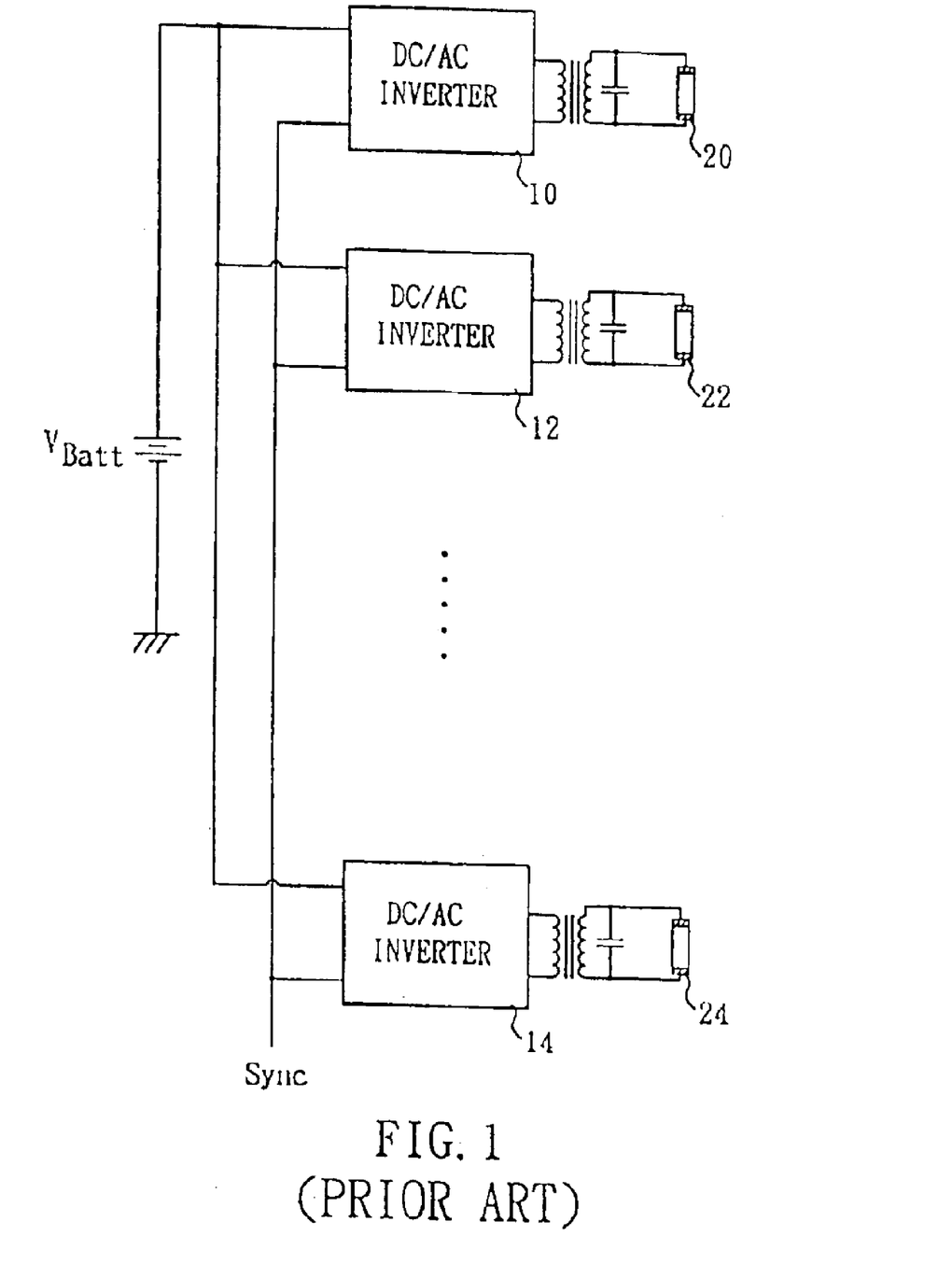
FIG. 1 is a schematic diagram depicting a prior art circuit used for driving multiple CCFL loads, wherein all DC/AC inverters are synchronized in driving the CCFL loads.

CCFL loads are extensively used to provide backlighting for liquid crystal displays (LCD), particularly for backlighting LCD monitors and LCD televisions. However, such conventional applications require a separate direct current/alternative current power inverter (DC/AC power inverter) to drive an individual CCFL. Such an application is illustrated in FIG. 1, wherein each CCFL (20, 22, . . . 24) is powered by an individual DC/AC inverter (10, 12, . . . 14), respectively, and all DC/AC inverters are synchronized. Each DC/AC inverter includes a switched AC network and a power driver circuit. The power driver circuit may include a resonant tank circuit for the CCFL. The switched AC network in each inverter is driven ON/OFF synchronously. Therefore, there is a large ripple on the power line. A large current will be drawn from the power source $V_{Batt}$ when the switches in the switched networks are turned on and the current drawn is released when the switches are turned off. The simultaneous turning on and off at all inverters cause noises on the power line which degrades the signal/noise integrity in the system.

One method to reduce the ripple is to increase the filtering at the power line. However, the disadvantage is that the size of the circuit is increased, which in turn increases the system cost.

Figure 2:
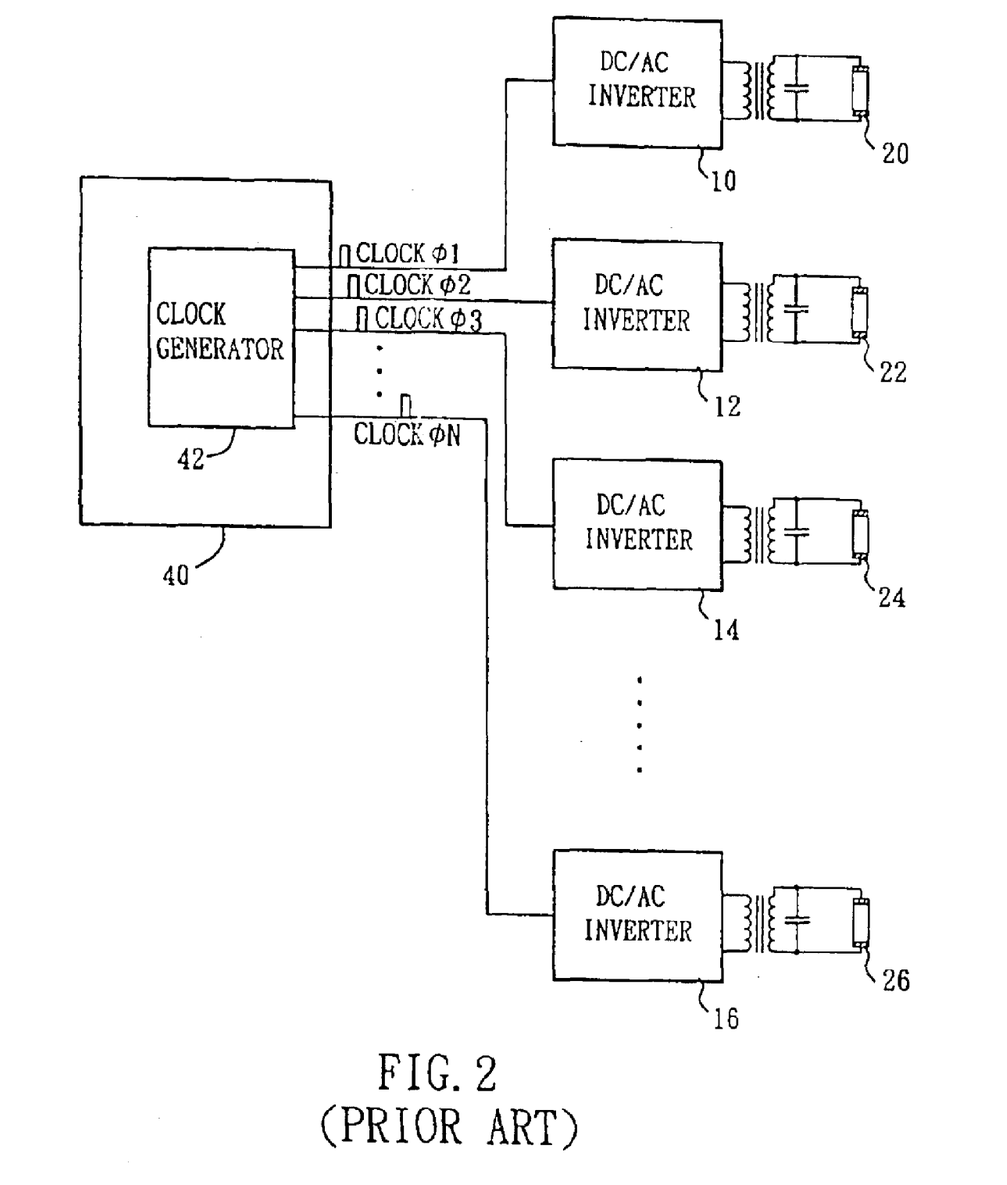
FIG. 2 is a schematic diagram depicting a prior art circuit used for driving multiple CCFL loads, wherein the circuit includes a controller and multiple DC/AC inverters and the controller generates a string of phase delay clock signals to the multiple DC/AC inverters.

FIG. 2 shows another prior art circuit for driving multiple CCFL loads where the circuit includes a controller (40) for driving multiple DC/AC inverters (10, 12, 14, . . . 16) and CCFL loads (20, 22, 24, . . . 26). A clock generator (42) in the controller (40) generates a string of phase-shifted clock signals to each DC/AC inverter (10, 12, 14, . . . 16) to make a phase delay. Since the switches in the networks of all DC/AC inverters (10, 12, 14, . . . 16) are turned on and turned off with equal phase shift between the adjacent inverters, the ripple on the power line is effectively reduced to 1/N of that shown in FIG. 1, where N is the number of DC/AC inverters connected.

However, the problem is that the controller (40) is fixed to the number of original demanded loads, in other words, the number of CCFL loads equals to the lines which deliver phase shifts from the controller (40) to each inverter (10, 12, . . . 16). Therefore, if the number of CCFL loads is changed, the configuration of the controller (40) should be changed. Another disadvantage is that the controller (40) needs to generate a high-frequency clock signal having a frequency of N times the operating frequency of the individual DC/AC inverter.

SUMMARY OF THE INVENTION

It is an object of the present invention to provide a simpler controller of a simpler phase shift circuit technique, wherein a simpler user-programmable number of phases according to the number of inverters is used, such that a high power, low cost and smaller multiple-inverter system can be achieved.

It is another object of the present invention to provide an improved electrical circuit comprising multiple power circuits, such as DC/AC inverters, for driving multiple loads, such as CCFL loads, which reduces instantaneous high current ripples and noises caused by turning ON and turning OFF switches in the power circuits simultaneously.

It is yet another object of the present invention to provide a display device comprising at least two loads, such as CCFL loads. The display device may be an LCD monitor, an LCD television or an LCD computer.

It is yet another object of the present invention to provide a method for driving an electrical circuit comprising multiple power circuits, such as DC/AC inverters, for driving multiple loads, such as CCFL loads, which reduces instantaneous high current ripples and noises caused by turning ON and turning OFF switches in the power circuits simultaneously.

Briefly, the controller of the present invention comprises a pulse generator for generating a clock signal for initiating the operation of the DC/AC inverters connected; and a phase selector for generating a reference signal indicating a number of DC/AC inverters connected.

In addition, the electrical circuit in accordance with the present invention provides a phase shift of the switching ON/OFF between DC/AC inverters for driving CCFL loads, wherein the number of phase shifts is programmed in accordance with the number of DC/AC inverters connected. According to the present invention, a first DC/AC inverter receives a first pulse signal from the pulse generator and a reference signal from the phase selector indicating the number of phases and generates a second pulse signal to a second DC/AC inverter. The second DC/AC inverter receives the second pulse signal having a phase shift with respect to the first pulse signal input to the first DC/AC inverter. Likewise, the second DC/AC inverter generates a third pulse signal to a third DC/AC inverter having the same amount of phase shift with respect to the second pulse signal input to the second DC/AC inverter, whereby all DC/AC inverters are turned on and turned off with equal phase shift between the adjacent inverters. According to the present invention, the ripple on the power line is thus effectively reduced, the circuit is programmable and simplified and the cost is reduced.

BRIEF DESCRIPTION OF THE DRAWINGS

For a more complete understanding of the present invention and the advantages thereof, reference is now made to the following descriptions taken in conjunction with the accompanying drawings which illustrate the embodiments of the present invention, wherein.

DETAILED DESCRIPTION OF THE PREFERRED EMBODIMENTS

Figure 3:
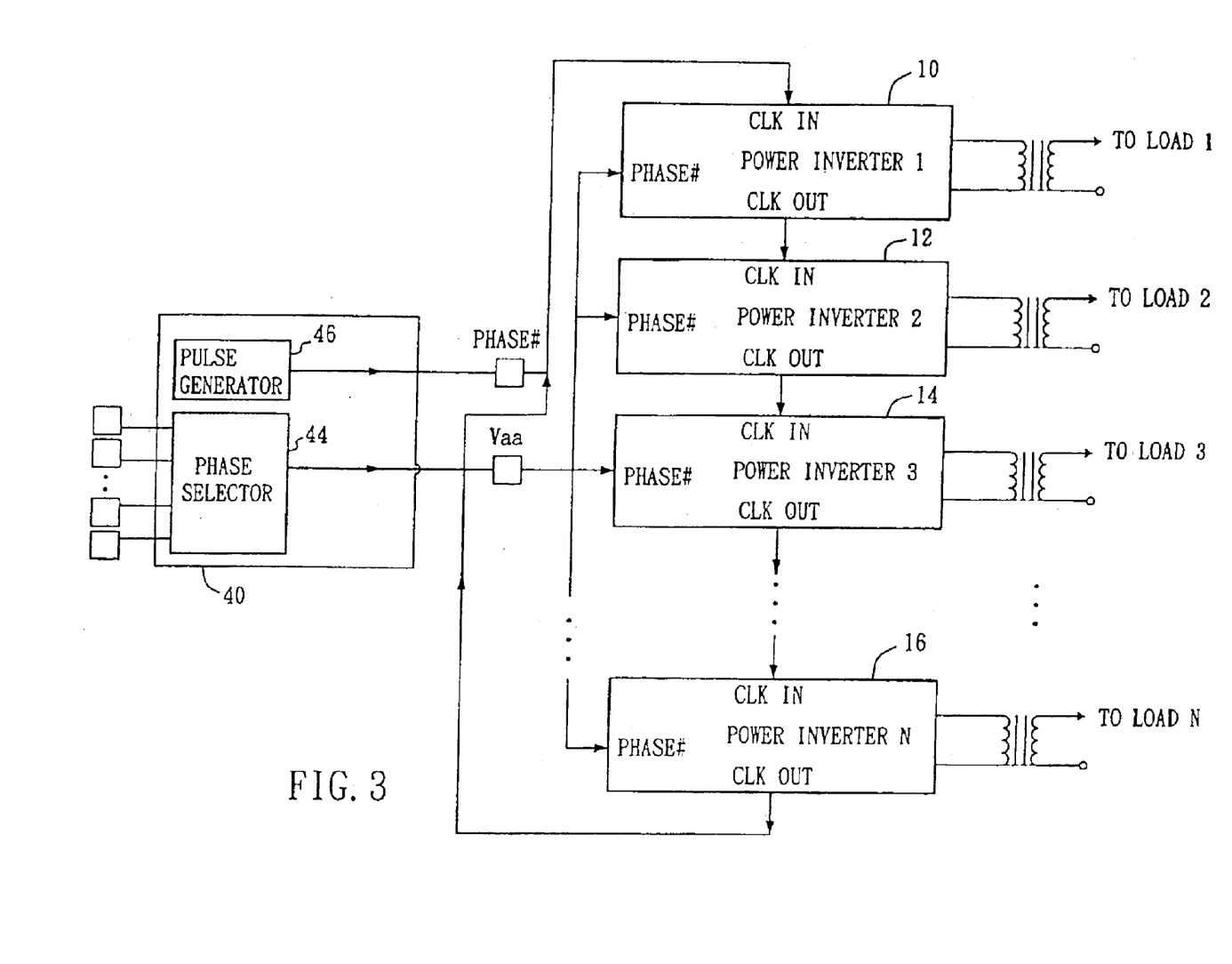
FIG. 3 is a block diagram of an electrical circuit in accordance with the present invention that is used for driving multiple CCFL loads.

FIG. 3 is a block diagram of the electrical circuit in accordance with the present invention used for driving multiple loads, such as light source loads or CCFL loads. The electrical circuit comprises a controller (40) and at least two power circuits (10,12), such as DC/AC inverters. The controller (40) comprises a selector (44), such as a phase selector, and a pulse generator (46), such as an oscillator.

The selector (44) generates a reference signal according to variable input signals and the reference signal is coupled to the at least two power circuits (10,12) for indicating a number of power circuits controlled or a number of phases to be shifted. That is to say, if there are four power circuits to be connected, an output of the selector (44) will output a reference signal that represents four power circuits being connected by the variable input signal(s). Therefore, the power circuits to be controlled can be programmable according to the input signal(s) without changing the circuit arrangements of the control circuit (40) and the power circuits (10, 12). The selector (44) can be a digital-to-analog converter or an analog-input-analog-output circuit.

The pulse generator (46) generates a first pulse signal and the first pulse signal is coupled to a first power circuit (10) of the at least two power circuits (10,12) for initiating the operation of the first power circuit (10) of the at least two power circuits (10,12). The first power circuit (10) then outputs a second pulse signal to initiate the operation of a second power circuit (12) of the at least two power circuits (10,12). The at least two power circuits (10,12) are each coupled to a transformer and a load, such as light source or a CCFL, so as to supply energy to the loads.

For simplification, the operation of the electrical circuit of the present invention comprising two power circuits is explained as follows:

The selector (44) first generates a reference signal to the two power circuits (10, 12) according to the input signal(s) coupled to the selector (44) for indicating a number of power circuits controlled (the number is two in this case). The pulse generator (46) then generates a first pulse signal to a first power circuit (10) for initiating the operation of the first power circuit (10). The first power circuit (10) is coupled to a first transformer which is coupled to a first load, such as a light source or a CCFL, and controls the operation of the first load. The first power circuit (10) outputs a second pulse signal to a second power circuit (12) for initiating the operation of the second power circuit (12), wherein the second pulse signal is delayed with respect to the first pulse signal sent to the first power circuit (10). The second power circuit (12) is coupled to a second transformer which is coupled to a second load, such as a light source or a CCFL, and controls the operation of the second load. Likewise, the second power circuit (12) outputs a third pulse signal to the first power circuit (10) for the second operational cycle. The third pulse signal is delayed with respect to the second pulse signal sent to the second power circuit (12). The first power circuit (10) then outputs a fourth pulse signal, wherein the fourth pulse signal is delayed with respect to the third pulse signal sent to the first power circuit (10). It is usually the pulse signal output from the last power circuit as the input pulse signal to the first power circuit. According to the present invention, the two power circuits (10, 12) are turned on and turned off with equal phase shift. Therefore, the ripple on the power line is thus effectively reduced, the circuit is programmable and simplified and the cost is reduced. The advantages of the present invention will be more apparent when the number of power circuits is large.

The electrical circuit of the present invention can be applied to a display device, such as an LCD monitor, an LCD television or an LCD computer. The display device may comprise, in addition to the controller, at least two power circuits, at least two transformers, at least two light sources and a display panel.

Figure 4:
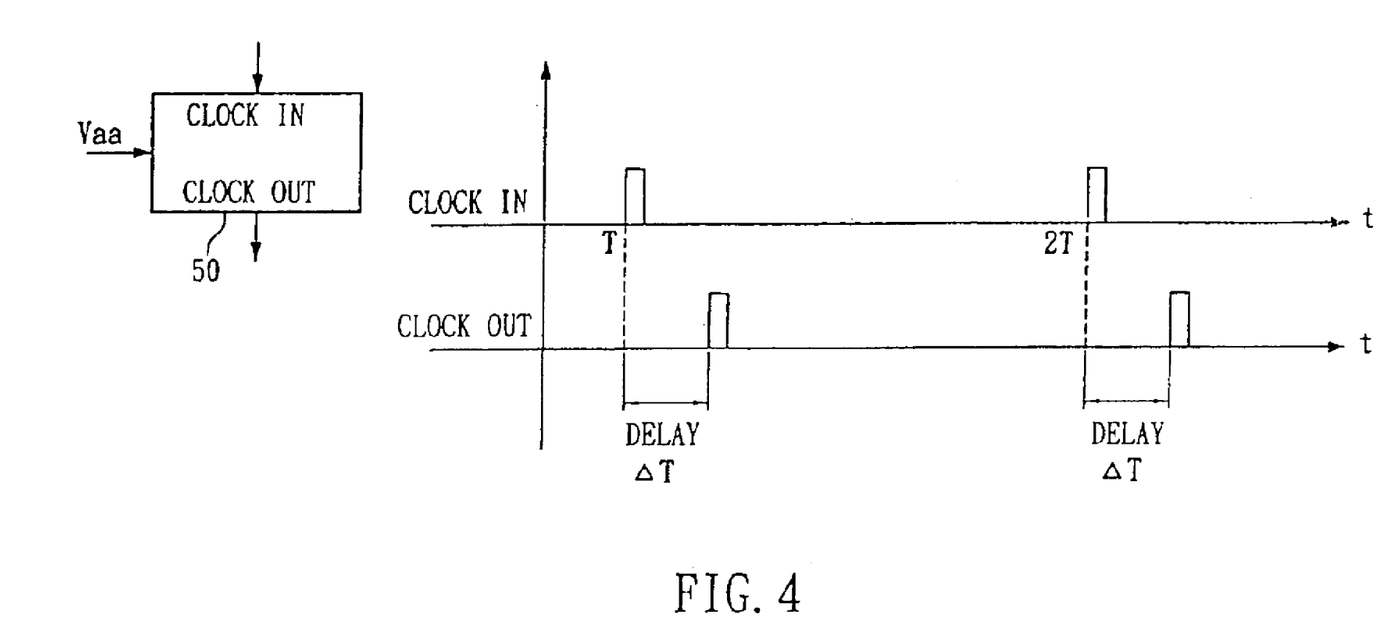
FIG. 4 is a signal representation of an input clock and an output clock for a DC/AC inverter.

FIG. 4 is a signal representation of an input clock and an output clock for a power circuit. There is a time delay, □T, between the input clock signal and output clock signal. The delay is a kind of phase shift delay and is generated by a delay circuit, which will be discussed later.

Figure 5:
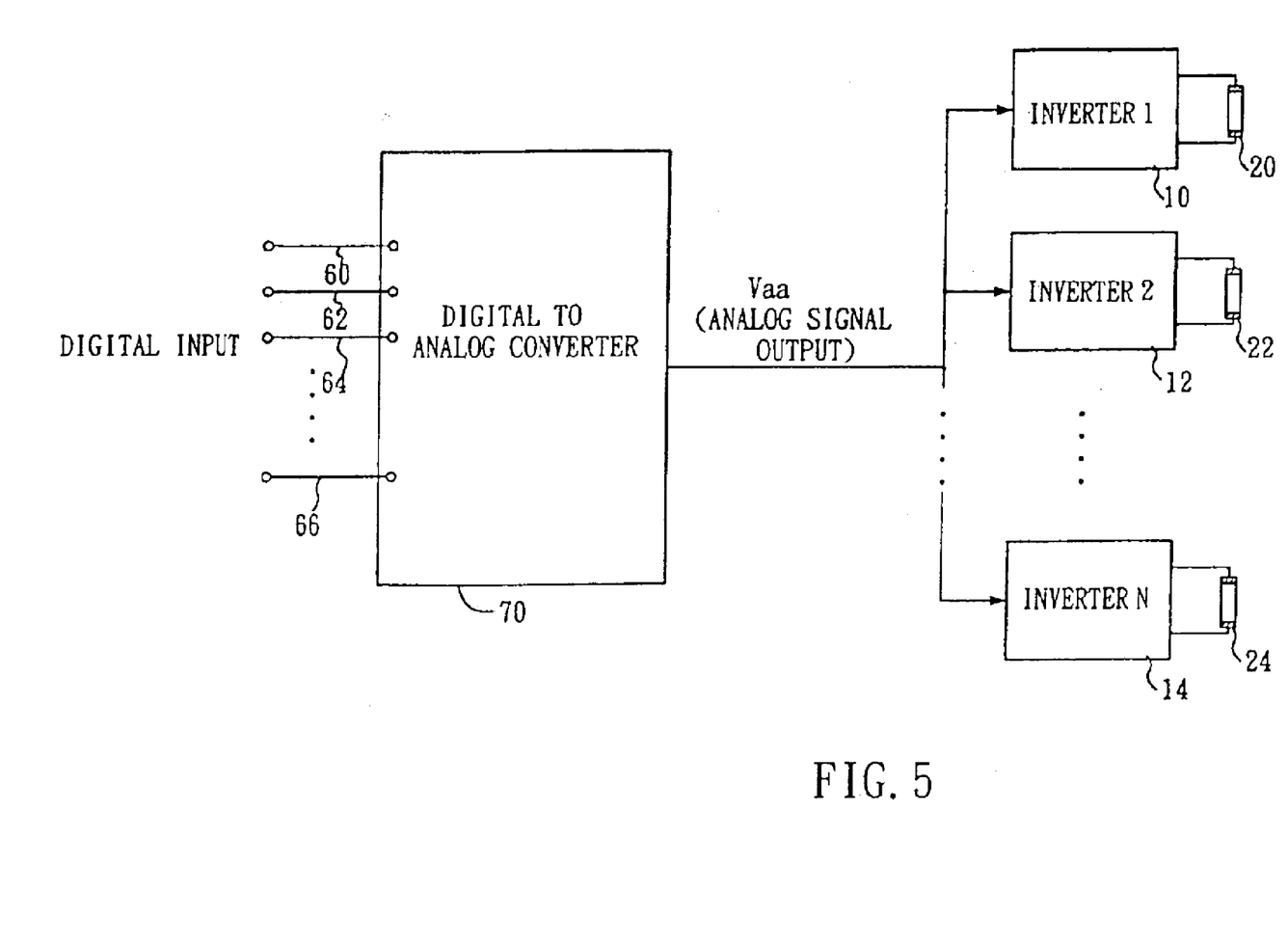
FIG. 5 is an exemplary selector circuit, wherein the inputs coupled to the selector circuit are digital signals and the output coupled to the DC/AC inverters is an analog signal.
Figure 6:
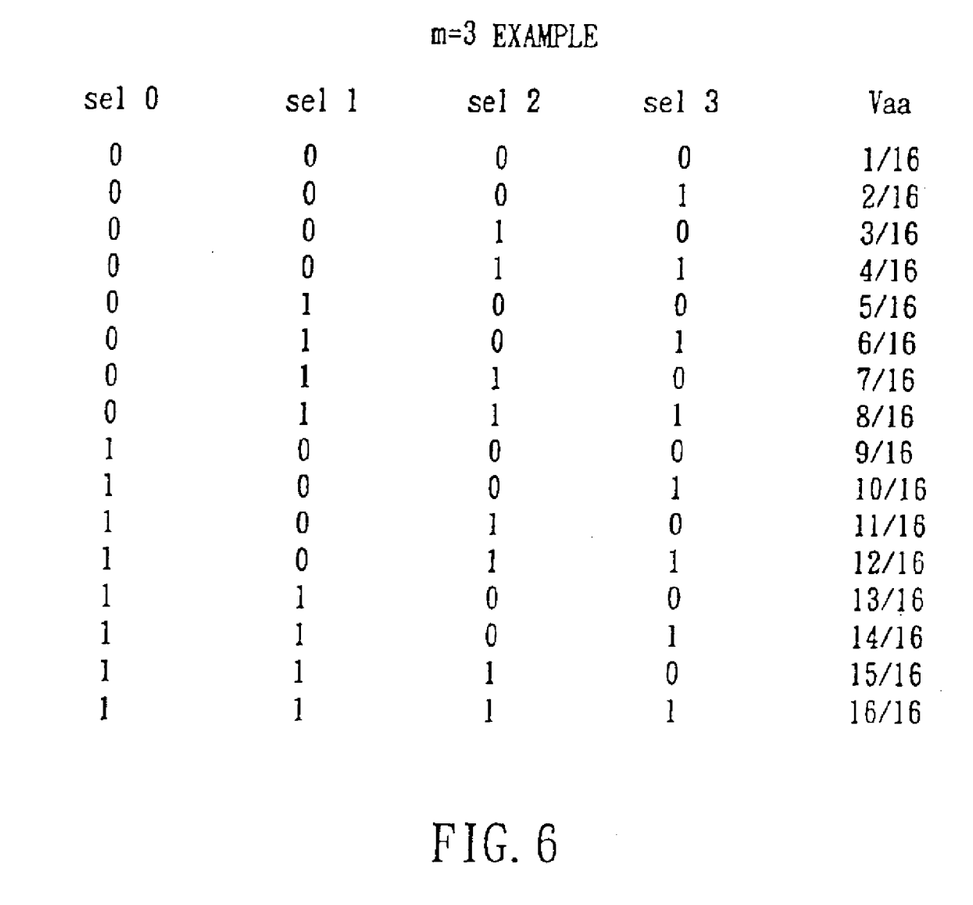
FIG. 6 is an exemplary schematic of the input signals coupled to the selector circuit and their corresponding output signals.

FIG. 5 is an exemplary selector circuit (70), wherein the inputs (60, 62, 64, . . . 66) coupled to the selector circuit (70), such as a digital to analog converter, are digital signals and the output coupled to the power circuits (10, 12, . . . 14) is an analog signal (Vaa). The input signals coupled to the selector circuit (70) and their corresponding output signals are shown in FIG. 6. That is to say, if the input terminals of the selector (70) are four, then the power circuits to be controlled can be programmed to sixteen.

Figure 7:
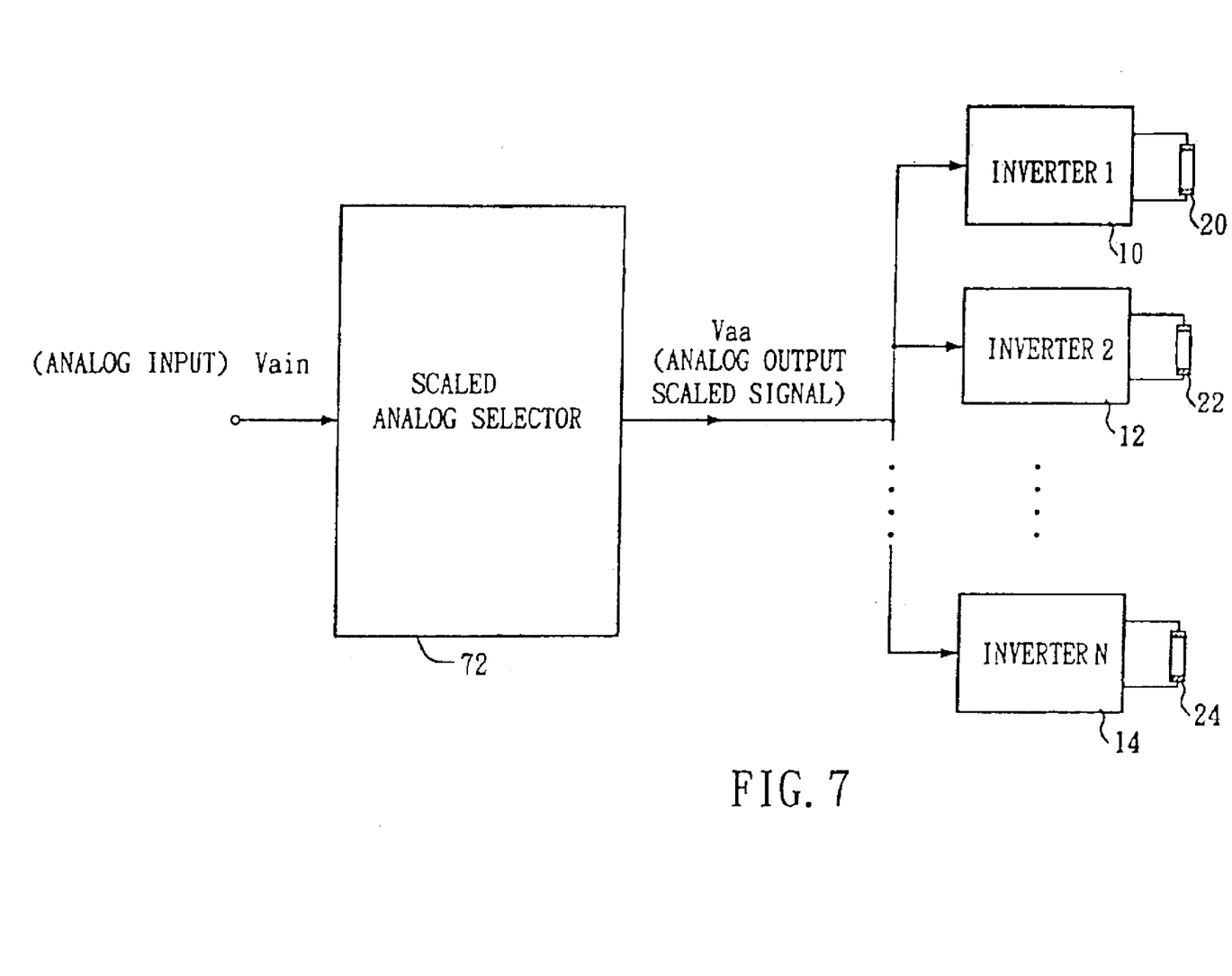
FIG. 7 is an exemplary selector circuit, wherein the input coupled to the selector circuit is an analog signal and the output coupled to the DC/AC inverters is an analog signal.
Figure 8:
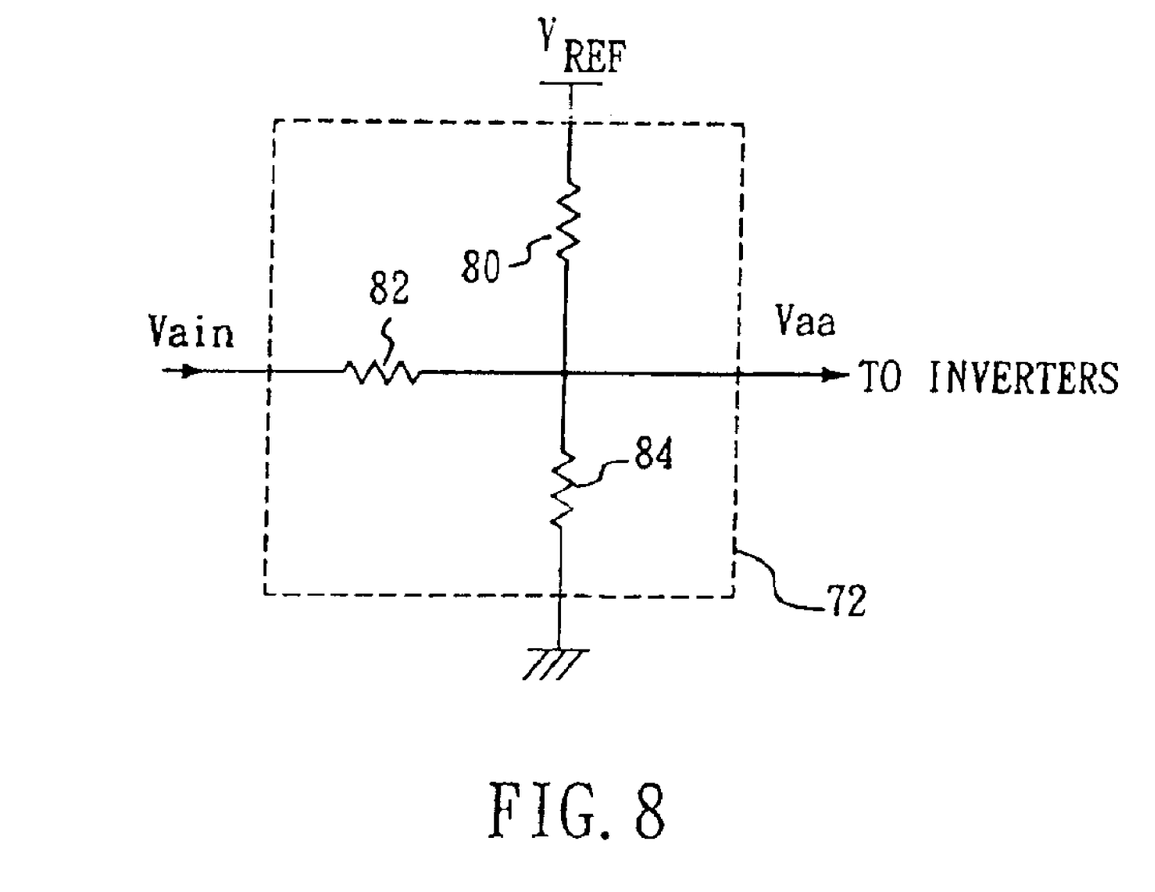
FIG. 8 is an exemplary schematic of the selector circuit illustrated in FIG. 7.

FIG. 7 illustrates another exemplary selector circuit (72), such as a scaled analog selector, wherein the input coupled to the selector circuit is an analog signal (Vain) and the output coupled to the power circuits (10, 12, . . . 14) is an analog signal (Vaa). FIG. 8 is an exemplary schematic of the selector circuit (72) illustrated in FIG. 7, wherein Vain stands for the analog input of the selector circuit (72) and Vaa stands for the analog output of the selector circuit (72). The value of Vaa can be obtained by using a superposition method based on the values of Vain, Vref and three resistors (80, 82, 84).

Figure 9:
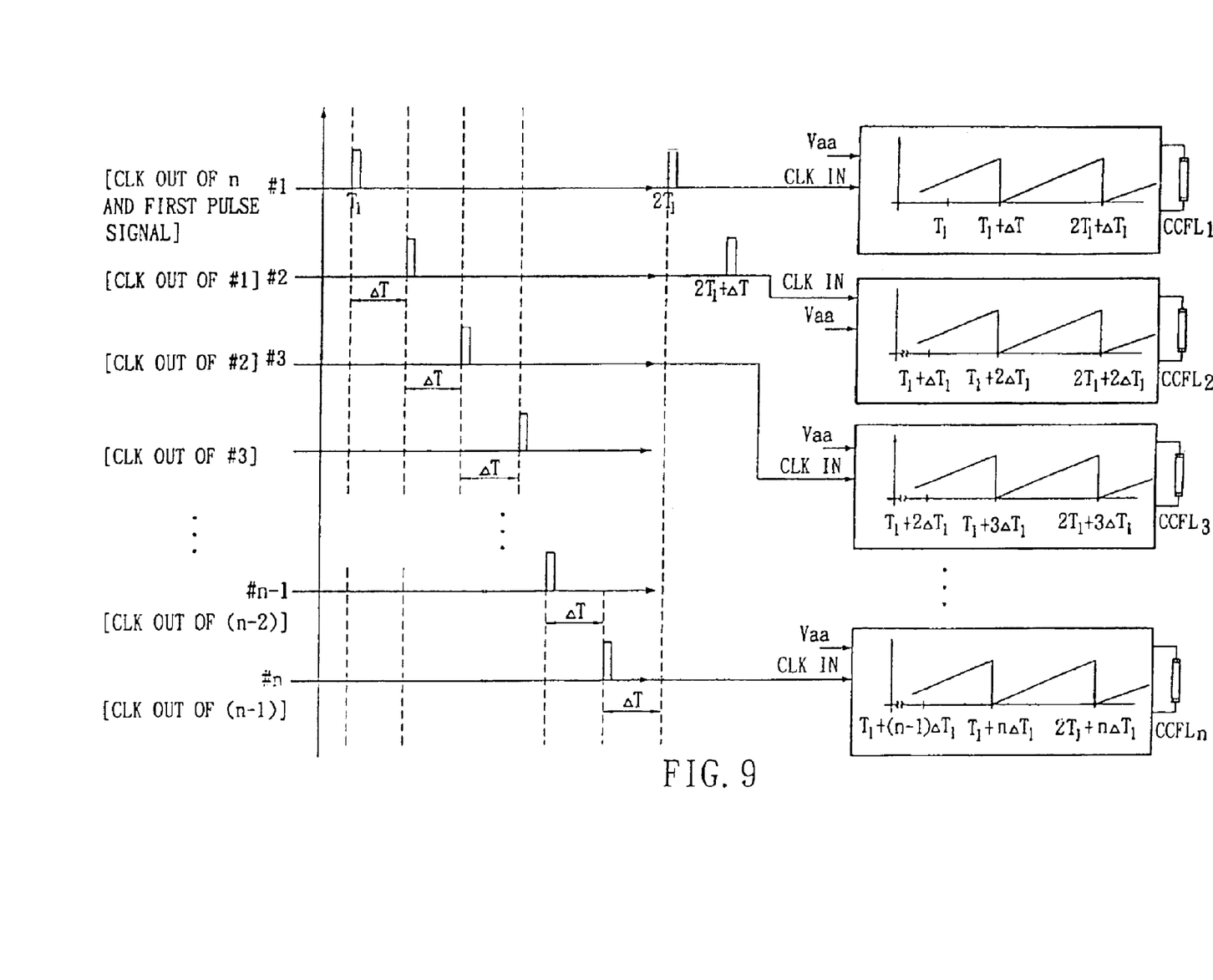
FIG. 9 is an exemplary schematic of a delay circuit of a DC/AC inverter comprising a ramp signal generated based on the input clock signal.

FIG. 9 is an exemplary schematic of a delay circuit in a power circuit comprising a ramp signal generated based on the input clock signal and the reference signal. The delay □T is generated by the delay circuit between each phase. FIG. 9 also illustrates a series of signals coupled to each CCFL sequentially, wherein the delay of initial point is generated by a ramp generator based on the first pulse signal and the reference signal.

Figures 10A, 10B:
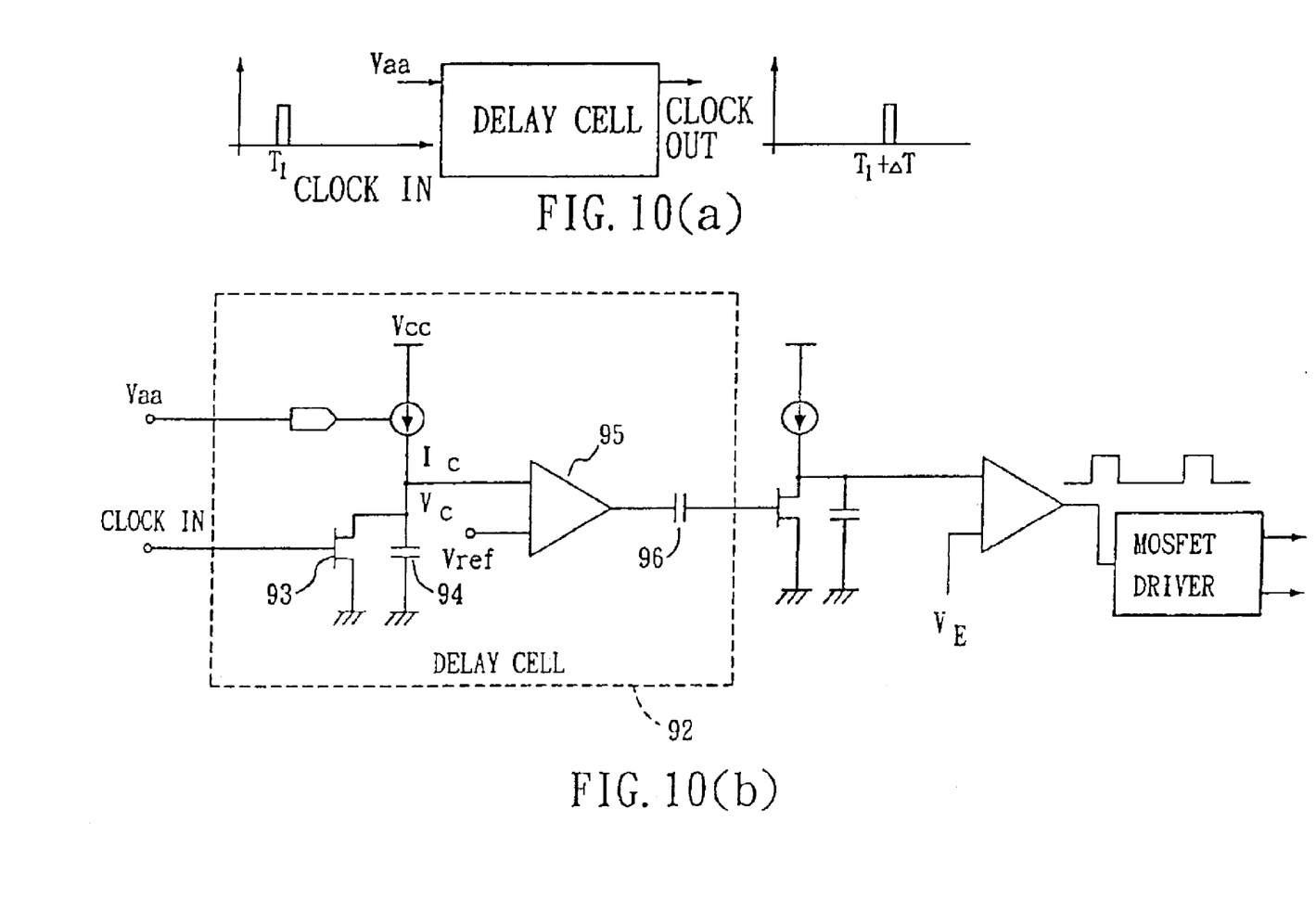
FIG. 10(a) is a schematic diagram of a delay cell in the present invention.
FIG. 10(b) is an exemplary delay circuit of a DC/AC inverter comprising a delay cell illustrated in FIG. 10(a) which is operated according to the input clock signal and the output signal of the selector circuit.

FIG. 10(a) is a schematic diagram of a delay cell in the present invention. It illustrates the delay □T generated by the delay cell between the clock in signal and clock out signal. FIG. 10(b) is an exemplary delay circuit of a power circuit comprising a delay cell (92) illustrated in FIG. 10(a). The delay □T is mainly determined by the reference signal Vaa. First of all, when a CLOCK IN signal is coupled to the delay cell (92) at the very beginning of time, the transistor (93) is turned on and the voltage Vc is dropped to 0V. Meanwhile, a capacitor (94) is charged by a current Ic once the CLOCK IN signal drops to turn off transistor (93) (starting of delay time) until the voltage on the capacitor (94) is higher than Vref. When the voltage on the capacitor (94) is higher than Vref, a comparator (95) will change state and generate a pulse signal (end of delay time) via a capacitor (96) to next stage. The current Ic is determined by a difference between Vaa and Vcc. In one example, the higher the value of Vaa is, the smaller current Ic will be and the more charge time there is. In other words, the delay time is increased. In another example, the higher the value of Vaa is, the higher current Ic will be and thus the less charge time there is. In other words, the delay time is decreased.

Figure 11A:
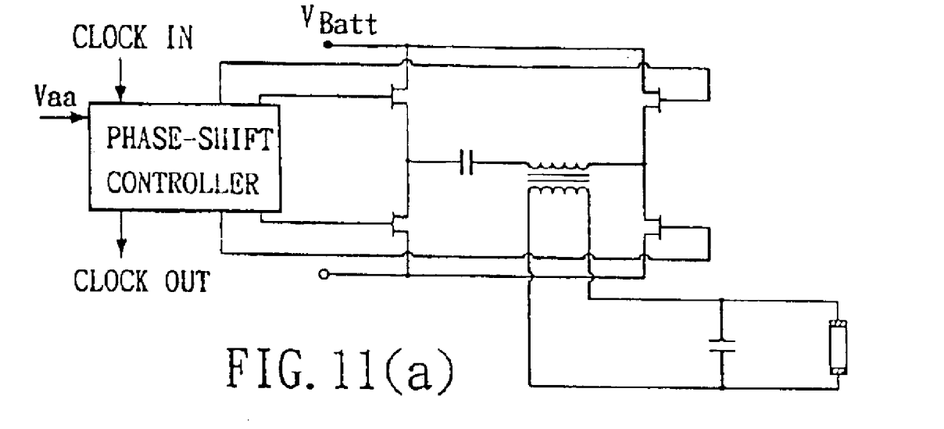
FIGS. 11(a)–11(e) are exemplary DC/AC inverters implementing the electrical circuit of the present invention.
Figure 11B:
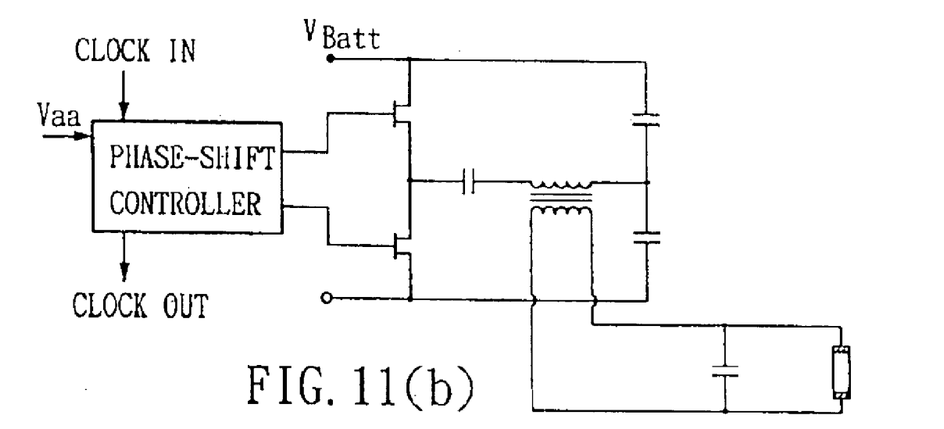
Figure 11C:
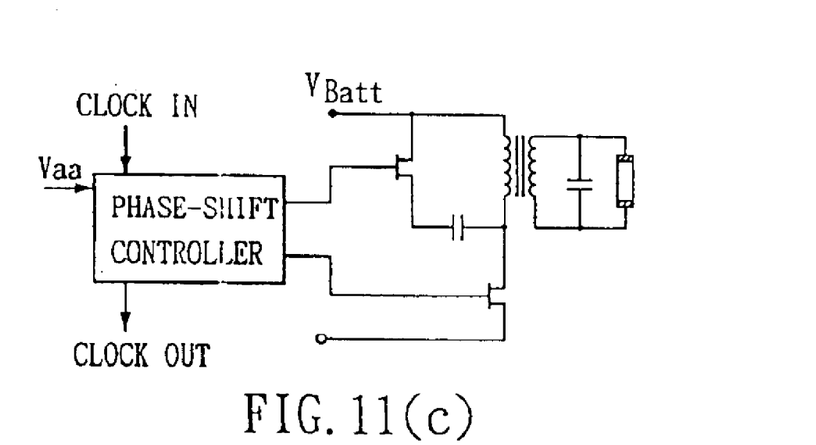
Figure 11D:
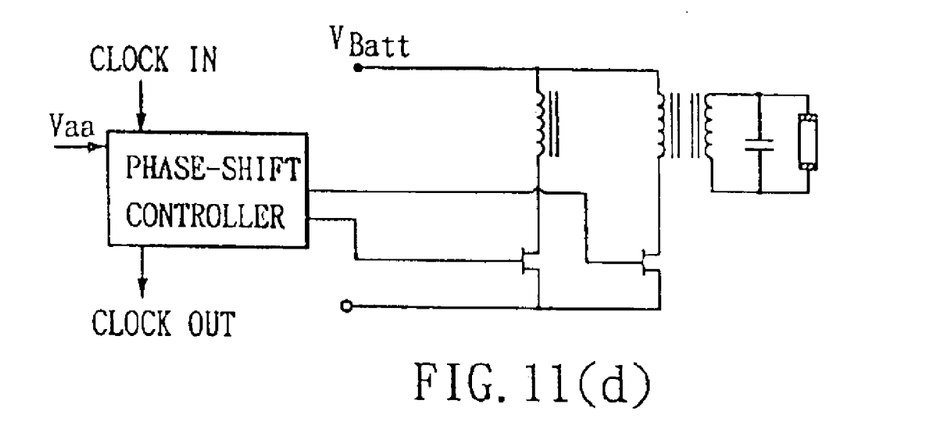
Figure 11E:
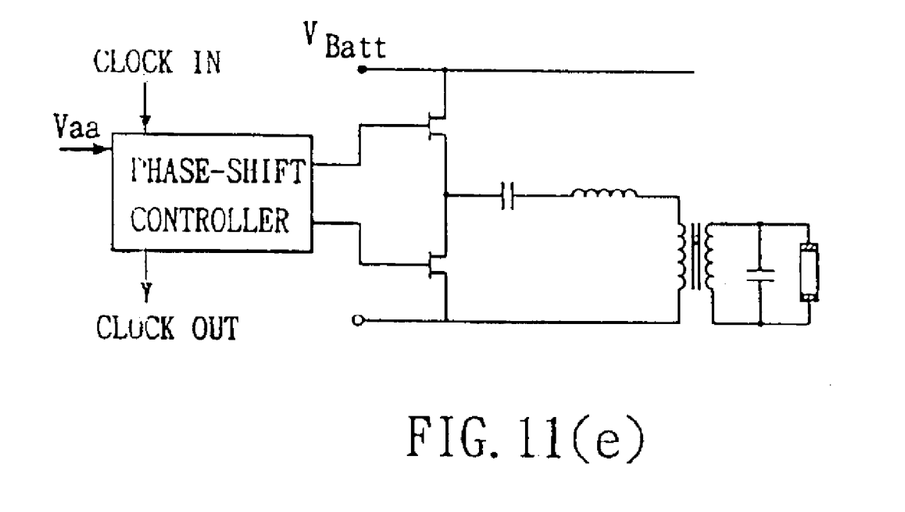

FIGS. 11(a)–11(e) are exemplary DC/AC inverters implementing the electrical circuit of the present invention. FIG. 11(a) is a full-bridge DC/AC inverter, FIG. 11(b) is a half-bridge DC/AC inverter, FIG. 11(c) is a fly-back forward DC/AC inverter, FIG. 11(d) is a push-pull DC/AC inverter and FIG. 11(e) is a class D DC/AC inverter.

Although the present invention and its advantage have been described in detail, it should be understood that various changes, substitutions and alternations can be made herein without departing from the spirit and scope of the invention as defined by the appended claims.

What is claimed is:

1. A controller comprising:
    circuitry capable of transmitting a pulse to a first power inverter circuit of a plurality of power inverter circuits; and
    reference signal generation circuitry capable of transmitting a reference signal to each of the plurality of power inverter circuits proportional to the plurality of power inverter circuits.

2. The controller of claim 1, further comprising a pulse generator.

3. The controller of claim 2, further comprising an oscillator.

4. The controller of claim 1, wherein the reference signal generation circuitry further comprises at least one programming input terminal.

5. The controller of claim 4, wherein the at least one programming input terminal is capable of accepting a digital programming input signal.

6. The controller of claim 4, wherein the at least one programming input terminal is capable of accepting an analog programming input signal.

7. A method comprising:
    (a) generating a reference signal from a controller proportional to a plurality of power inverter circuits;
    (b) transmitting the reference signal from the controller to the plurality of power inverter circuits;
    (c) generating a start pulse from the controller to a power inverter circuit of the plurality of power inverter circuits;
    (d) generating a delay period in the power inverter circuit based on the reference signal; and
    (e) outputting a start pulse from the power inverter circuit to a subsequent power inverter circuit of the plurality of power inverter circuits after the delay period.

8. The method of claim 7, further comprising programming a number into the controller representing the plurality of power inverter circuits.

9. The method of claim 8, wherein programming the number into the controller representing the plurality of power inverter circuits further comprises using a digital programming signal.

10. The method of claim 8, wherein programming the number into the controller representing the plurality of power inverter circuits further comprises using an analog programming signal.

11. The method of claim 7, further comprising repeating (d) and (e) for subsequent power inverter circuits of the plurality of power inverter circuits.

* * * * *